US005643403A

United States Patent [19]

Poole et al.

[11] Patent Number: 5,643,403
[45] Date of Patent: Jul. 1, 1997

[54] WALL COVERING REMOVAL SYSTEM WITH A SURFACE CLEANING APPARATUS AND A SURFACE SCARIFYING APPARATUS

[75] Inventors: Robert N. Poole, 110 E. Greenway Pky. #1105, Phoenix, Ariz. 85022; Daniel L. Poole, Phoenix, Ariz.

[73] Assignee: Robert N. Poole, Phoenix, Ariz.

[21] Appl. No.: 358,847

[22] Filed: Dec. 19, 1994

[51] Int. Cl.[6] .................. B32B 35/00

[52] U.S. Cl. .................. 156/584; 156/344; 15/104.94; 15/111; 15/244.1; 30/172; 30/365; 30/366; 401/52; 401/126; 401/130; 401/196; 401/207; 401/261

[58] Field of Search .................. 30/169, 172, 365, 30/366; 15/104.93, 104.94, 105, 111, 219, 244.1; 401/42, 52, 119, 123, 126, 129, 130, 196, 207, 261; 156/344, 584

[56] References Cited

U.S. PATENT DOCUMENTS

| | | | |
|---|---|---|---|
| 663,303 | 12/1900 | Sutton . | |
| 1,434,744 | 11/1922 | Hibbler . | |
| 1,651,933 | 12/1927 | Patton . | |
| 2,435,349 | 2/1948 | Hall | 164/99 |
| 2,678,492 | 5/1954 | Steenson | 30/307 |
| 2,686,694 | 8/1954 | Freeman | 401/123 X |
| 2,849,737 | 9/1958 | Piccinini et al. | 15/138 |
| 3,123,851 | 3/1964 | Arndt et al. | 15/546 |
| 3,447,181 | 6/1969 | Coker et al. | 15/244.1 X |
| 3,514,854 | 6/1970 | Norfleet | 30/365 |
| 3,521,968 | 7/1970 | Wise | 401/186 |
| 3,740,848 | 6/1973 | Lindley | 30/319 |
| 3,989,390 | 11/1976 | Thorner | 401/42 |
| 4,008,968 | 2/1977 | Hobbs | 401/207 |
| 4,146,943 | 4/1979 | Wertheimer et al. | 30/172 X |
| 4,157,874 | 6/1979 | Durand | 401/4 |
| 4,201,491 | 5/1980 | Kohler | 401/264 |
| 4,209,027 | 6/1980 | Morganroth | 132/9 |
| 4,236,651 | 12/1980 | Meyer et al. | 222/82 |
| 4,254,738 | 3/1981 | Stanley | 119/83 |
| 4,274,202 | 6/1981 | Petrick | 30/366 X |
| 4,502,223 | 3/1985 | Brookfield | 30/365 |
| 4,527,741 | 7/1985 | Garneau | 239/333 |
| 4,546,513 | 10/1985 | Hammond | 15/106 |
| 4,571,766 | 2/1986 | Goldman et al. | 15/244.1 X |
| 4,781,311 | 11/1988 | Dunning et al. | 222/153 |
| 4,850,729 | 7/1989 | Kramer et al. | 401/183 |
| 4,922,859 | 5/1990 | Durell et al. | 119/83 |
| 5,020,181 | 6/1991 | Leonard | 30/172 X |
| 5,024,546 | 6/1991 | Guzman et al. | 401/16 |
| 5,074,045 | 12/1991 | Brookfield | 30/172 |
| 5,090,832 | 2/1992 | Rivera et al. | 401/132 |
| 5,299,877 | 4/1994 | Birden | 401/206 |
| 5,316,403 | 5/1994 | Mansour | 401/207 |

FOREIGN PATENT DOCUMENTS

| | | | |
|---|---|---|---|
| 2017488 | 10/1979 | United Kingdom | 401/261 |

OTHER PUBLICATIONS

Suds, Scrubs, Scrapes; Modern Plastics, May 1954, p. 106. May 1954.

*Primary Examiner*—Mark A. Osele
*Attorney, Agent, or Firm*—Parsons & Goltry; Robert A. Parsons; Michael W. Goltry

[57] ABSTRACT

A wall covering removal system for removing material from a surface comprising a scarifying apparatus for scarifying a material, having a handle, a scarifying assembly coupled to a first end, and a first scraper blade coupled to a second end, and a liquid dispensing and cleaning apparatus for wetting the scarified material, including a dispensing device coupled in liquid communication with a reservoir for dispensing liquid through a spray nozzle, a cleaning device coupled to the dispensing device, including a support member coupled to the dispensing device and positioned so as to avoid hindering a liquid sprayed from the nozzle of the dispensing device and a cleaning member coupled to the support member so as to extend forwardly of the dispensing device.

13 Claims, 9 Drawing Sheets

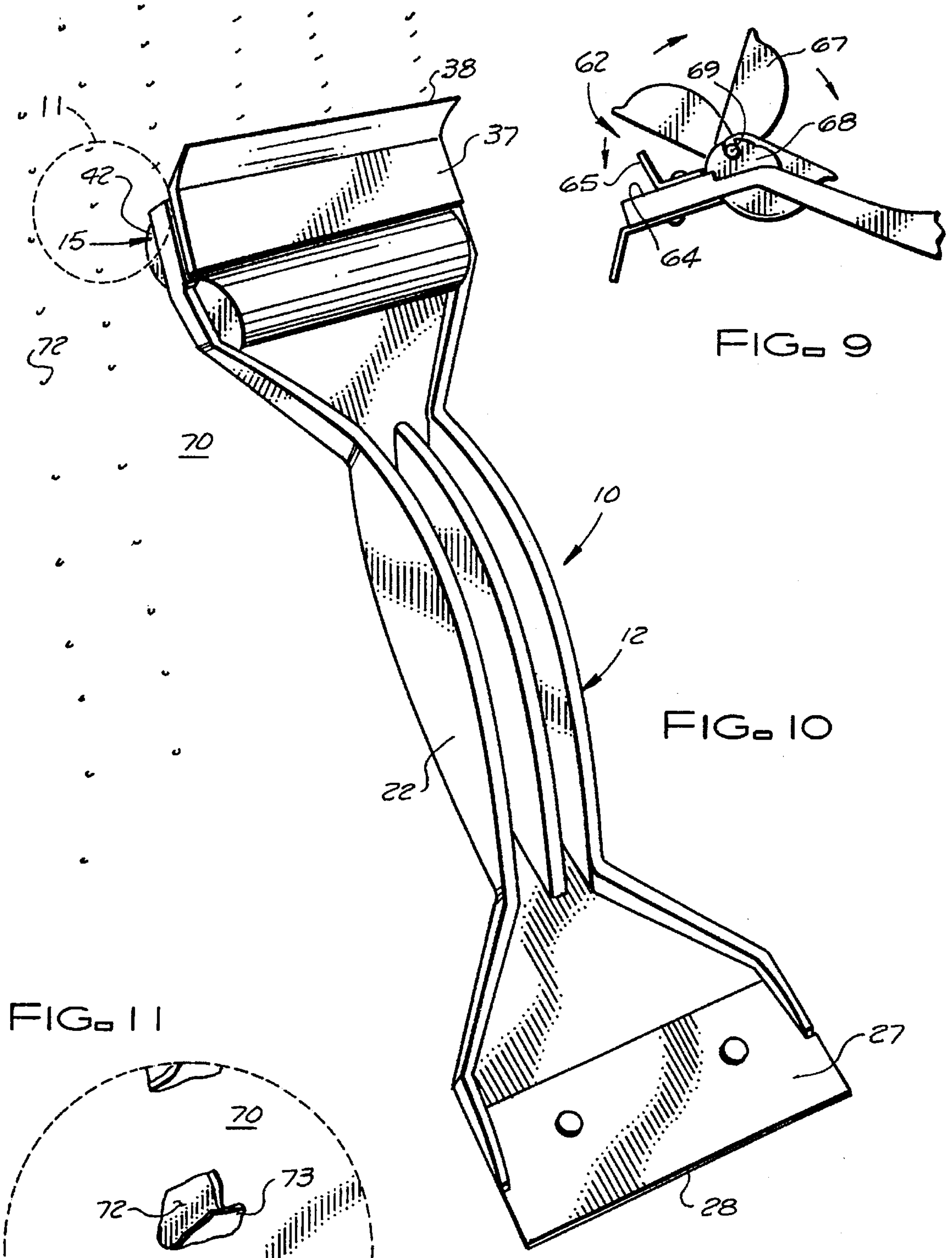
FIG. 9
FIG. 10
FIG. 11
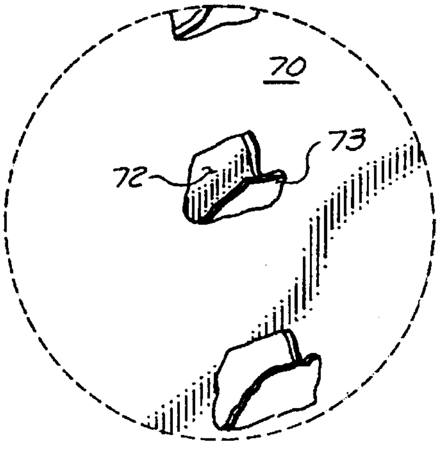

FIG. 24
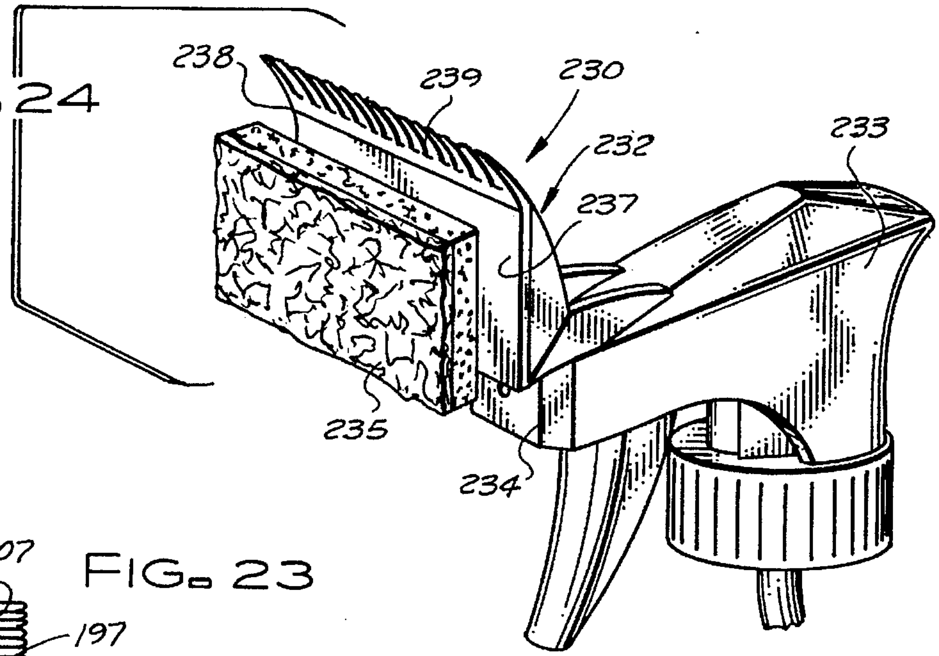
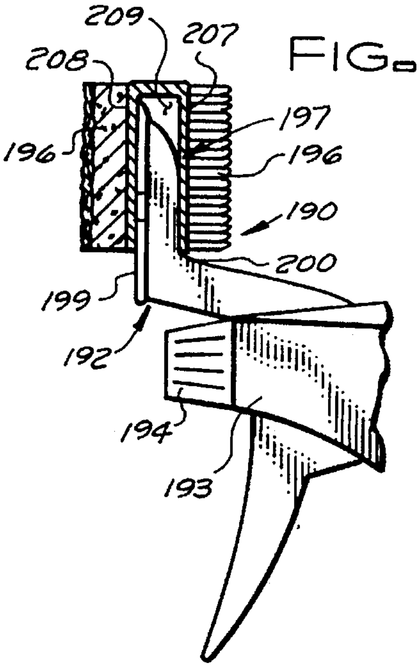
FIG. 23
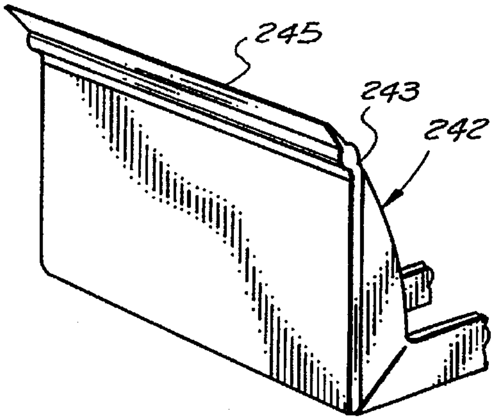
FIG. 25
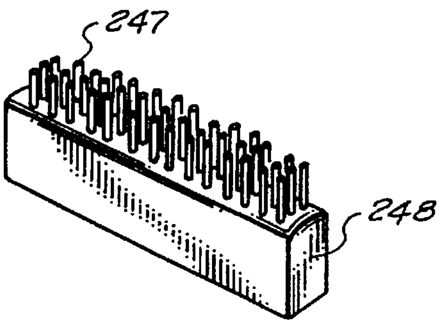
FIG. 27
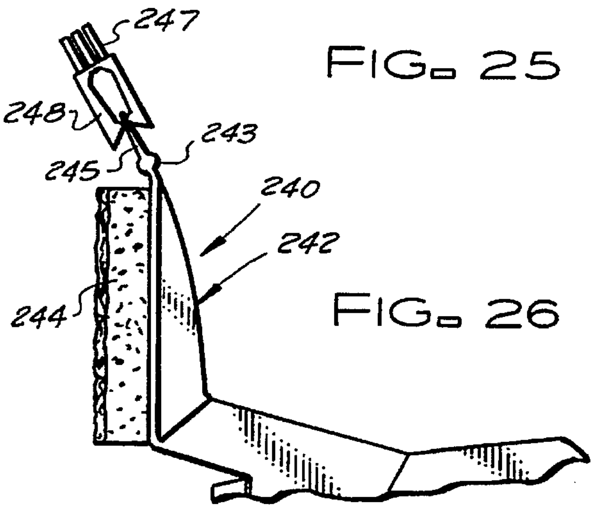
FIG. 26

WALL COVERING REMOVAL SYSTEM WITH A SURFACE CLEANING APPARATUS AND A SURFACE SCARIFYING APPARATUS

BACKGROUND OF THE INVENTION

1. Field of the Invention

This invention relates to wall covering removal devices.

More particularly, the present invention relates to a system for wall covering removal and surface cleaning and preparation.

In a further and more specific aspect, the present invention concerns an apparatus for scarifying a wall surface and more specifically a wall covering, and a fluid dispensing and surface cleaning apparatus for cleaning surfaces and preparing a wall covering, after scarification, for removal.

2. The Prior Art

One of the most time consuming and difficult processes in redecorating an interior space, is the preparation of wall surfaces such as the removal of undesirable wallpaper and paint from a wall surface. Wallpaper is bonded to a wall with an adhesive which is sometimes very tenacious and difficult to loosen, while paint must be scraped. For many years the preferred method of removing wallpaper has been to loosen the adhesive by wetting. Various means have been developed for this end, including steaming, soaking with warm water, use of enzymatic fluids etc. Many wallpapers however, will defeat penetration of the fluid, thereby preventing access to the adhesive. To overcome this difficulty it is known to scarify the wallpaper, breaching its integrity and permitting fluid to reach the adhesive. To accomplish scarification and removal of wallpaper, a plethora of scraping devices and perforating devices have been developed.

Perforating devices include rollers having spikes which puncture the wallpaper. These devices are not extremely successful because the small puncture formed in the wallpaper is effectively closed by the removal of the spike. Also, many of these devices cause damage to the underlying surface. The spike which penetrates the wallpaper, also penetrates the wall. Subsequent devices have been more successful and generally include the use of a plurality of discs having teeth. The teeth extend outward from the rim of the disc. What differentiates and makes these devices successful is that the discs are placed at an angle to one another. When used, the discs plow, pushing the paper in an outward or sideways direction. This causes a larger opening in the paper that is not closed upon removal of the teeth from the paper. Because these devices are angled, and need to plow the paper, the orientation of the discs is very important. The discs are generally carried by a handle which properly orients them in relationship with the surface upon which they are used. If the handle, and thus the discs are tilted forwardly or rearward, the discs will not properly contact and perforate the wallpaper because the plowing action has been reduced or eliminated. An individual has a natural inclination to tilt a hand held device as he/she extends an arm holding the device up the surface of a wall and pulls a device downward toward themselves. Thus, to prevent tilting, the handle of the device is so constructed as to prevent this natural tilting of the device.

After the scarification of the wallpaper, a fluid is applied to the wallpaper and allowed to soak through and loosen the adhesive. To apply the fluid, spray devices and sponges are conventionally used. After the fluid has been applied the wallpaper is stripped off using a scraper.

After the bulk of the wallpaper has been removed, portions of backing and adhesive generally remain. These must also be cleaned off the wall by wetting with a spray device or sponge, then using a scraper.

Each of the steps mentioned has a separate tool, a perforator, a fluid dispensing apparatus, and a scraping apparatus. Removal of wallpaper can become expensive with all this equipment and changing tools during the process may become difficult and tedious, as many times an individual is using a ladder or moving along a wall, requiring each of the tools to be carried along or retrieved when needed.

Cleaning a surface has application to surfaces other than cleaning during removal of wallpaper, including cleaning floors, counter tops etc. Again, to clean a surface, a cleaning fluid is generally applied, such as by a spray dispenser. After spraying, however, the dispenser must be put aside while a cleaning apparatus such as a brush or sponge is used. If more difficult to remove materials are present, a stiff brush or scraper may be required. As with wallpaper removal, this requires carrying a number of implements as the individual moves along the surface to be cleaned. Furthermore, preparatory to beginning cleaning, these implements must all be found and assembled to be available during the cleaning process.

It would be highly advantageous, therefore, to remedy the foregoing and other deficiencies inherent in the prior art.

Accordingly, it is an object of the present invention to provide a system for the removal of a wall covering.

Another object of the present invention is to provide an apparatus for removing a wall covering.

And another object of the present invention is to provide an apparatus for scarifying a surface material.

Still another object of the present invention is to provide a fluid dispensing and cleaning apparatus.

Yet another object of the present invention is to provide a fluid dispensing apparatus having interchangeable cleaning attachments.

Yet still another object of the present invention is to provide a scarifying apparatus which will perform when tilted with respect to the surface being scarified.

A further object of the present invention is to provide an apparatus for removing a wall covering including a scarifying apparatus and scraper blades.

SUMMARY OF THE INVENTION

Briefly, to achieve the desired objects of the present invention in accordance with a preferred embodiment thereof, provided is a surface scarifying apparatus and surface cleaning apparatus used in combination to provide a wall covering removal system.

The scarifying apparatus includes a handle having a first end and a second end, a scarifying assembly coupled to the first end, and a first scraper blade coupled to the second end. The scarifying assembly includes an axle carried by the handle, a disc rotatably carried by the axle, and drag means for producing a drag on the rotation of the disc. The disc includes a plurality of teeth radiating radially outward from a peripheral edge, the plurality of teeth each having a hooked shape and include a flattened edge at a radially terminal end adjacent a tip.

Further provided are a plurality of substantially parallel discs, each rotatably carried by an axle, the axles being carried by the handle along substantially parallel axis.

In another embodiment, the scarifying assembly includes a toothed blade extending from the handle in an upright manner.

The cleaning apparatus includes a liquid reservoir, a dispensing device having a spray nozzle and coupled in liquid communication with the reservoir for dispensing liquid, a cleaning device coupled to the dispensing device, the cleaning device including a support member coupled to the dispensing device and positioned so as to avoid hindering a liquid sprayed from the nozzle of the dispensing device, and a cleaning member coupled to the support member so as to extend forwardly of the dispensing device.

Provided in further embodiments, is a fixed or removable support member, and a fixed or removable cleaning member. Also, the support member and cleaning member may be coupled to the dispensing device above the nozzle, or coupled to the dispensing device forward of the spray nozzle, and include an aperture therethrough for egress of sprayed liquid without hindrance.

BRIEF DESCRIPTION OF THE DRAWINGS

The foregoing and further and more specific objects and advantages of the instant invention will become readily apparent to those skilled in the art from the following detailed description of a preferred embodiment thereof, taken in conjunction with the drawings, in which:

FIG. 9 is a side plan view illustrating the apparatus for removing material of FIG. 8;

FIG. 10 is a perspective view of the apparatus for removing material from a surface as it would appear being employed as a scarifying apparatus, scarifying a wall covering;

FIG. 11 is an enlarged view of a scarified portion of the wall covering;

FIG. 23 is a sectional side view of the cleaning assembly of FIG. 22;

FIG. 24 is a perspective view of an embodiment of a cleaning assembly;

FIG. 25 is a perspective view of another embodiment of a support member;

FIG. 26 is a side view of an embodiment of a cleaning assembly employing the support member of FIG. 25; and FIG. 27 is an enlarged perspective view of the additional attachment of the cleaning assembly of FIG. 26.

DETAILED DESCRIPTION OF THE PREFERRED EMBODIMENT

Figure 1:
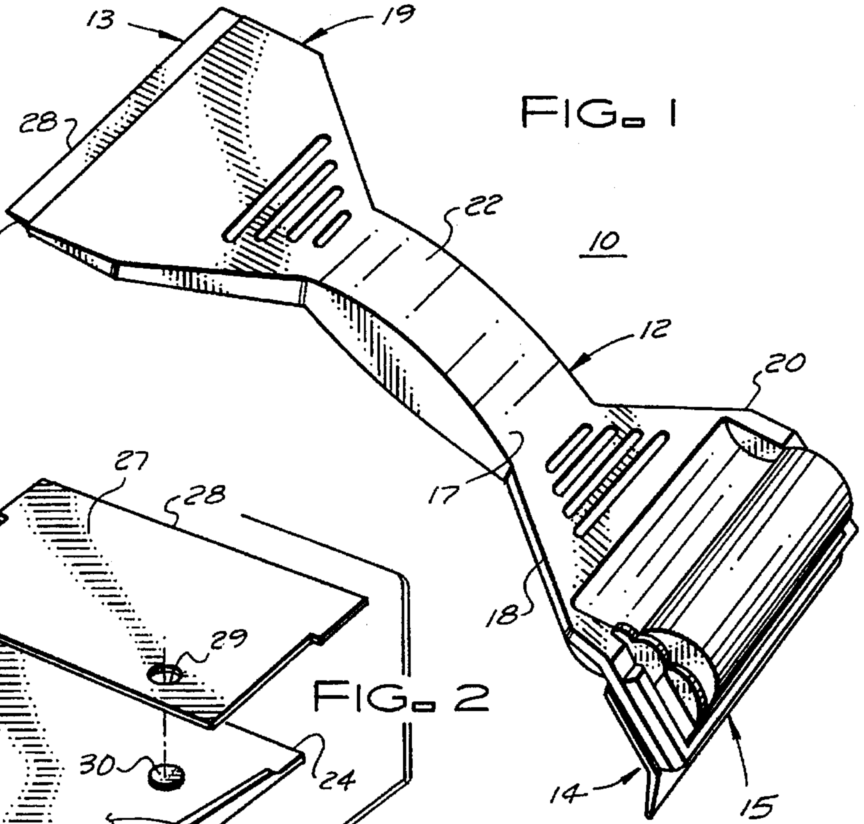
FIG. 1 is a perspective view of an apparatus for removing material from a surface, constructed in accordance with the teachings of the instant invention.

Turning now to the drawings in which like reference characters indicate corresponding elements throughout the several views, attention is first directed to FIG. 1 which illustrates an apparatus generally designated 10, for removing material from a surface. Apparatus 10 includes a handle 12, a push scraper 13, a pull scraper 14 and a scarifying assembly 15. Handle 12 is preferably formed from plastic, hardened rubber etc. in a conventional molding process, and has a top 17, a bottom 18, a flattened end 19, an opposing flattened end 20 and a grip 22. Grip 22 may be formed to comfortably conform to a users hand, and is preferably curved slightly for reasons which will become apparent later in the description.

Figure 2:
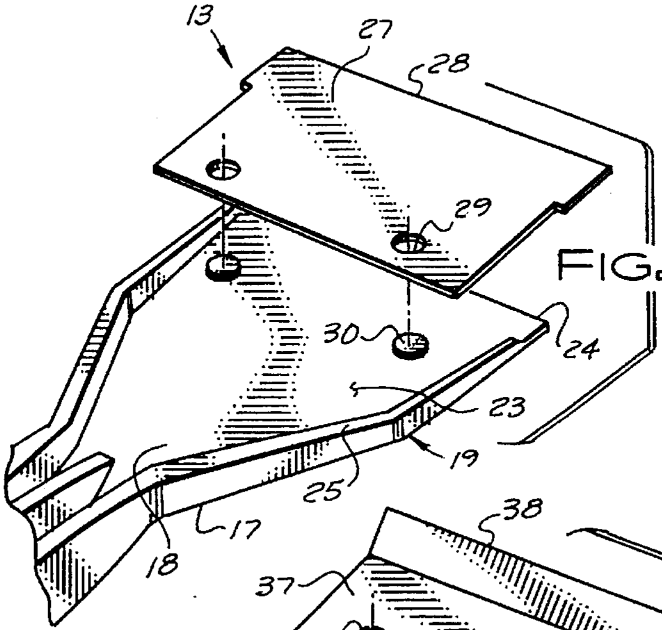
FIG. 2 is an enlarged perspective view of an end of the apparatus for removing material which carries a push scraper blade.

With additional reference to FIG. 2, the construction of push scraper 13 and flattened end 19 can be seen. Flattened end 19 includes a generally planar surface 23 corresponding to bottom 18 and terminating in a terminal edge 24. A structural ridges 25 may be formed along sides of flattened end 19 to provide additional strength and rigidity. A blade 27 having an edge 28 is carried by flattened end 19 in overlying engagement with planar surface 23 such that edge 28 extends past terminal edge 24. Blade 27 may be coupled to flattened end 19 in a large variety of manners such as the use of an adhesive, screws, clips, etc., and may be removable for changing blades. However, in this embodiment blade 27 includes a pair of spaced apart openings 29 formed therethrough. A pair of corresponding posts 30 extend from planar surface 23 and are configured to be received by openings 29, thereby properly positioning blade 27. Blade 27 is retained in position by deforming the ends of posts 30 to overlap blade 27.

Figure 3:
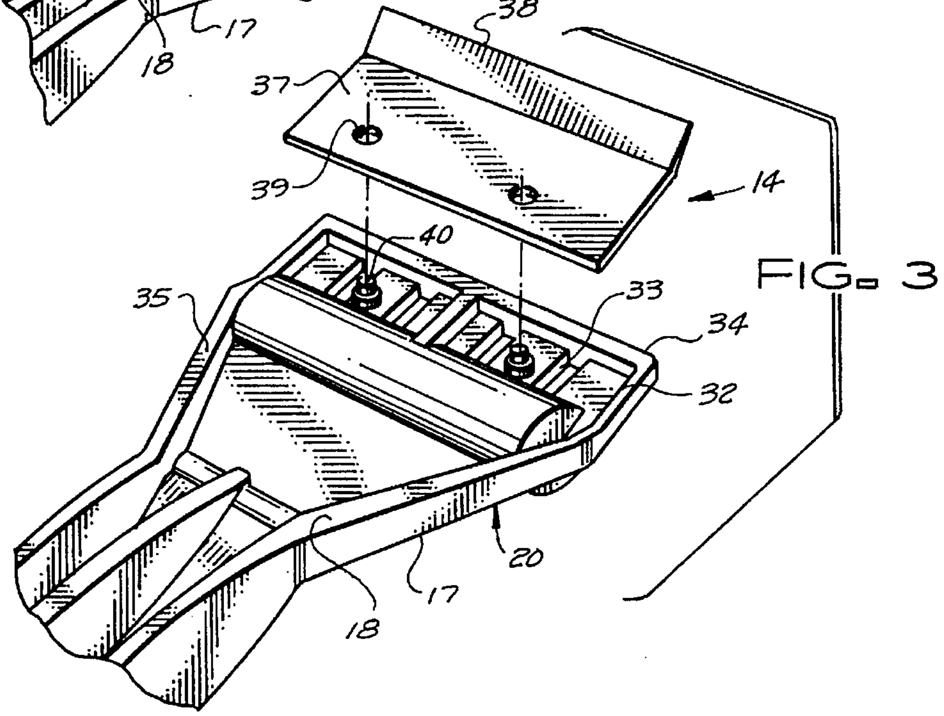
FIG. 3 is an enlarged perspective view of an end of the apparatus for removing material which carries a pull scraper blade.

Turning now to FIG. 3, the construction of pull scraper 14 and flattened end 20 can be seen. Flattened end 20 includes a carriage 33, the back side of which is visible and which will be discussed in greater detail in the description of scarifying assembly 15. A blade support structure 32, adding strength to flattened end 20 and configured to receive and support a blade 37, is carried by the back side of carriage, generally corresponding to bottom 18 and terminating in a terminal edge 34. Structural ridges 35 may be formed along sides of flattened end 20 to provide additional strength and rigidity. Blade 37 is carried by flattened end 20 proximate terminal edge 34 in overlying engagement with support structure 32, and has an edge 38 which extends past terminal edge 34. Blade 37 may be coupled to flattened end 20 in a large variety of manners such as the use of an adhesive, screws, clips, etc., and may be removable for changing blades. However, in this embodiment blade 37 includes a pair of spaced apart openings 39 formed therethrough. A pair of corresponding posts 40 extend from carriage 33 and are configured to be received by openings 39, thereby properly positioning blade 37. Blade 37 is retained in position by deforming the ends of posts 40 to overlap blade 37.

Figure 4:
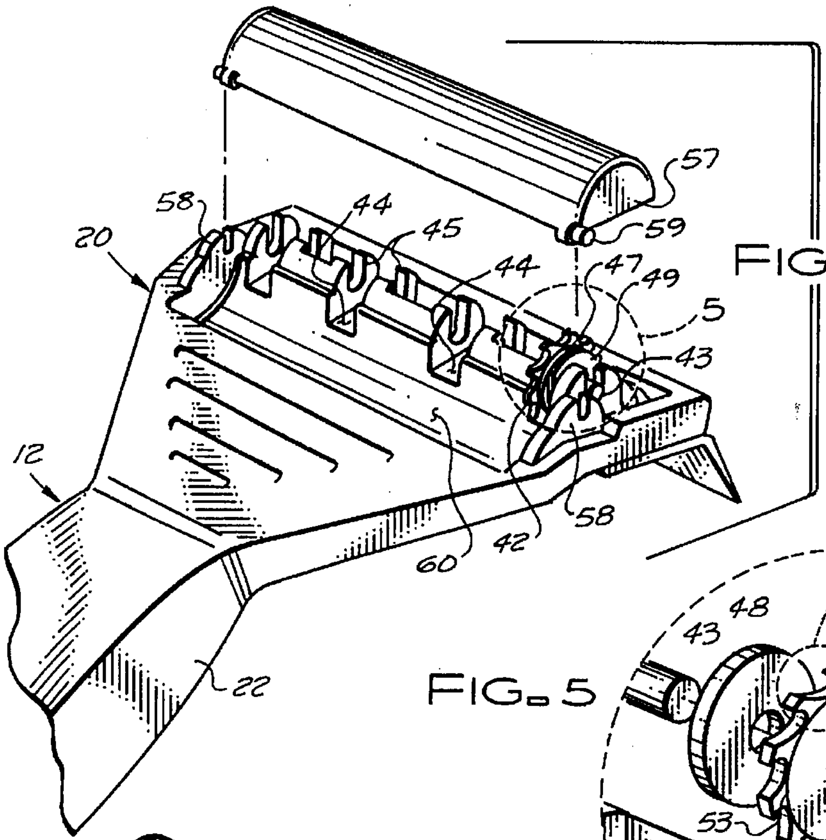
FIG. 4 is an enlarged perspective view of an end of the apparatus for removing material which carries a scarifying assembly.

Referring back to FIG. 1, and with additional reference to FIG. 4, scarifying assembly 15 is carried by carriage 33 formed in top 17 of flattened end 20 proximate terminal edge 34. Scarifying assembly 15 includes a plurality of disks 42 each carried by an axle 43 which is, in turn, carried by carriage 33. Carriage 33 includes a recessed surface 44 from which a plurality of paired brackets 45 extend. Each paired bracket 45 rotatably supports an axle 43. In this embodiment, there are four sets of brackets 45, axles 43 and disks 42, but it will be understood that more or less may be used as desired. Axles 43, in this embodiment, each extend along a common axis of rotation designated A, however it will be understood that each axle 43 may be located on individual axis of rotation which are substantially parallel. Furthermore, while an individual axle 43 is employed to support each disk 42, it will be understood that a single continuous axle may be employed.

Figure 5:
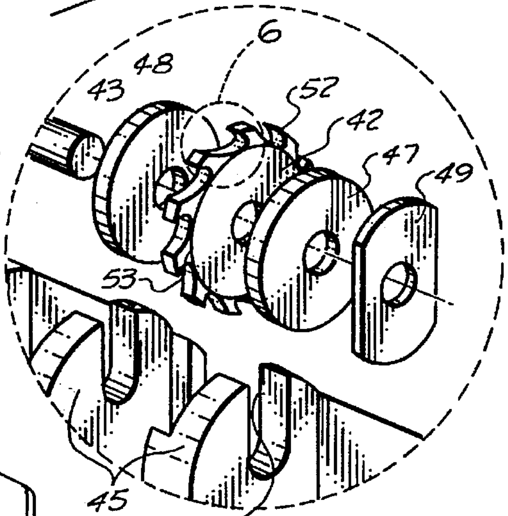
FIG. 5 is an enlarged exploded view of a scarifying assembly.

Each disk 42 is mounted on an axle 43 for rotation between paired brackets 45. Free, unhindered rotation of disks 42 is undesirable as this will inadequately breach the integrity of the wall covering. With additional reference to FIG. 5, an enlarged view of a single disk 42 with associated drag elements is illustrated. The mounting of a single disk will be described since each disk is mounted in a substantially identical manner. Disk 42 is carried by axle 43 and stabilized between two washers 47 and 48. A tension washer 49 is mounted on axle 43 between washer 48 and bracket 45. The shape of tension washer 49 compresses washer 48 against disk 42 producing the desired drag. A slot 50 may be formed in bracket 45, as in this embodiment, to receive and anchors tension washer 49 and prevent rotation thereof.

Figure 6:
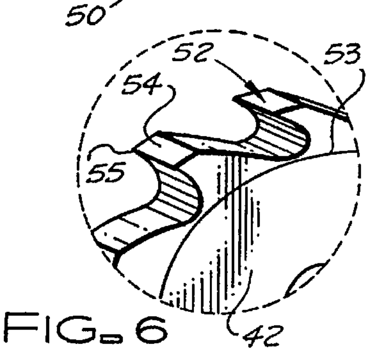
FIG. 6 is an enlarged view of the teeth of a disc.

Turning now to FIG. 6, each of disks 42 is generally round and include a plurality of teeth 52 radiating radially outward from a peripheral edge 53 thereof. Each of the plurality of teeth 52 have a hooked shape and include a flattened edge 54 at a radially terminal end adjacent a tip 55. The unique shape of each of the teeth permit scarifying a wall covering without damaging the underlying wall surface. The functional shape of the teeth will be discussed in greater detail below.

Figure 7:
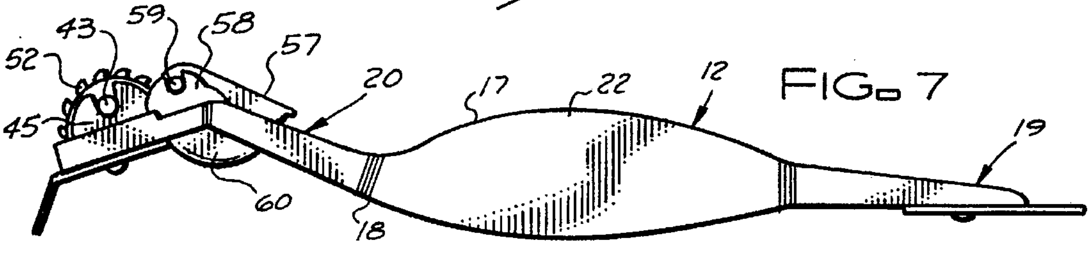
FIG. 7 is a side plan view illustrating the apparatus for removing material of FIG. 4.

As was mentioned previously, handle 12 is slightly curved. The curve is visible with reference to FIG. 7. When using push scraper 13, scarifying assembly 15 is substantially out of the way so as to avoid injury to the users wrist. However, to insure safety, a cover 57 is pivotally coupled to a pair brackets 58 positioned adjacent to and behind carriage 33 as can be seen with additional reference back to FIG. 4. Cover 57 includes pivot pins 59 which permit pivoting of cover 57 between a position covering disks 42, and an uncovered position as shown in FIG. 7. In the uncovered position, cover 57 is recessed within a curved depression 60 formed in handle 12 between brackets 58.

Figure 8:
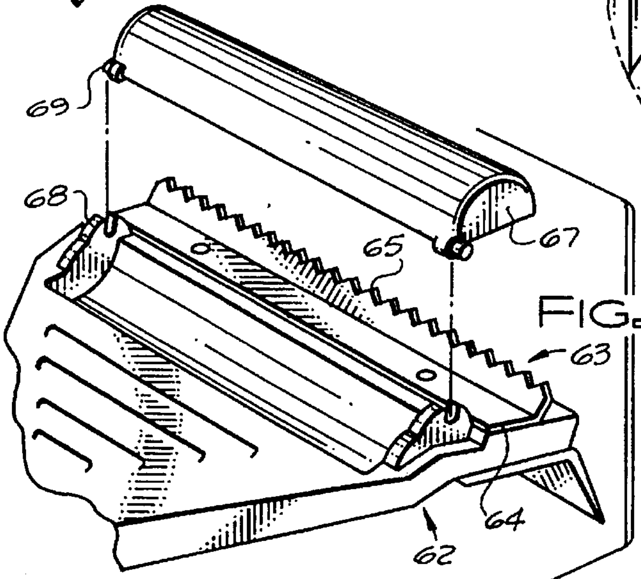
FIG. 8 is an enlarged perspective view of an end of another embodiment of an apparatus for removing material which carries another embodiment of a scarifying assembly.

Referring now to FIG. 8, another embodiment of an apparatus generally designated 62, for removing material from a surface is illustrated. Apparatus 62 is substantially similar to apparatus 10 with the exception of another embodiment of a scarifying assembly 63 being employed. In this embodiment, a planar surface 64 replaces carriage 33, and a serrated blade 65 is mounted thereon replacing disks 42. Serrated blade 65 will scarify wall coverings such as wallpaper, but is preferably used to scarify paint prior to removal with a scraper. To insure safety, a cover 67 is pivotally coupled to a pair brackets 68 positioned adjacent to and behind serrated blade 65. Cover 67 includes pivot pins 69 which permit pivoting of cover 67 between a position over serrated blade 65, and an uncovered position as shown in FIG. 9. Cover 67 is identical to that disclosed for apparatus 10 and is also employed to insure the safety of a user.

An effective method of removing wallpaper is to begin by scarifying the wallpaper. Scarifying consists of perforating, tearing or otherwise breaching the surface of the wallpaper to permit access to the wall surface and back side of the wallpaper. A liquid such as water or an enzyme is then applied to the wallpaper to loosen the adhesive bonding it to the wall surface. The liquid reaches the adhesive through the scarified areas. A detailed description of the apparatus for applying the liquid is included later in the description. After the adhesive is sufficiently loosened, scrapers may be used to remove the wallpaper.

Referring now to FIG. 10, scarifying a wall covering employing apparatus 10 is illustrated. Apparatus 10 is positioned with disks 42 contacting a wall covering 70 covering a wall surface, and pulled downward. Hooked shaped teeth 52 engage the covering at a downward angle made possible by the hooked shape and the flattened terminal edge. Tips 55 of teeth 52 are substantially parallel with the surface of the wall, having a sufficient angle to penetrate the covering but not damage the underlying surface. If disks 42 rotated freely, they would rotate with the downward movement of apparatus 10. The resulting perforations would be unsatisfactory. The drag on the disks, however, prevents the free rotation of disks 42 and result in a downward and outward tearing of the wall covering, forming a scarification 72 as can be seen with additional reference to FIG. 11. It can further be seen that as the teeth engage the wall covering, tips 55 in effect, penetrate the wall covering and are pulled downward behind it. As teeth 52 leave the scarification with the rotation of disks 42, tips 55 pull a tab 73 of wall covering 70 outward preventing closure of the scarification. It will be understood that disks 42 can be reversed to permit scarifying by pushing away with apparatus 10 instead of pulling down, as a matter of choice.

Figure 12:
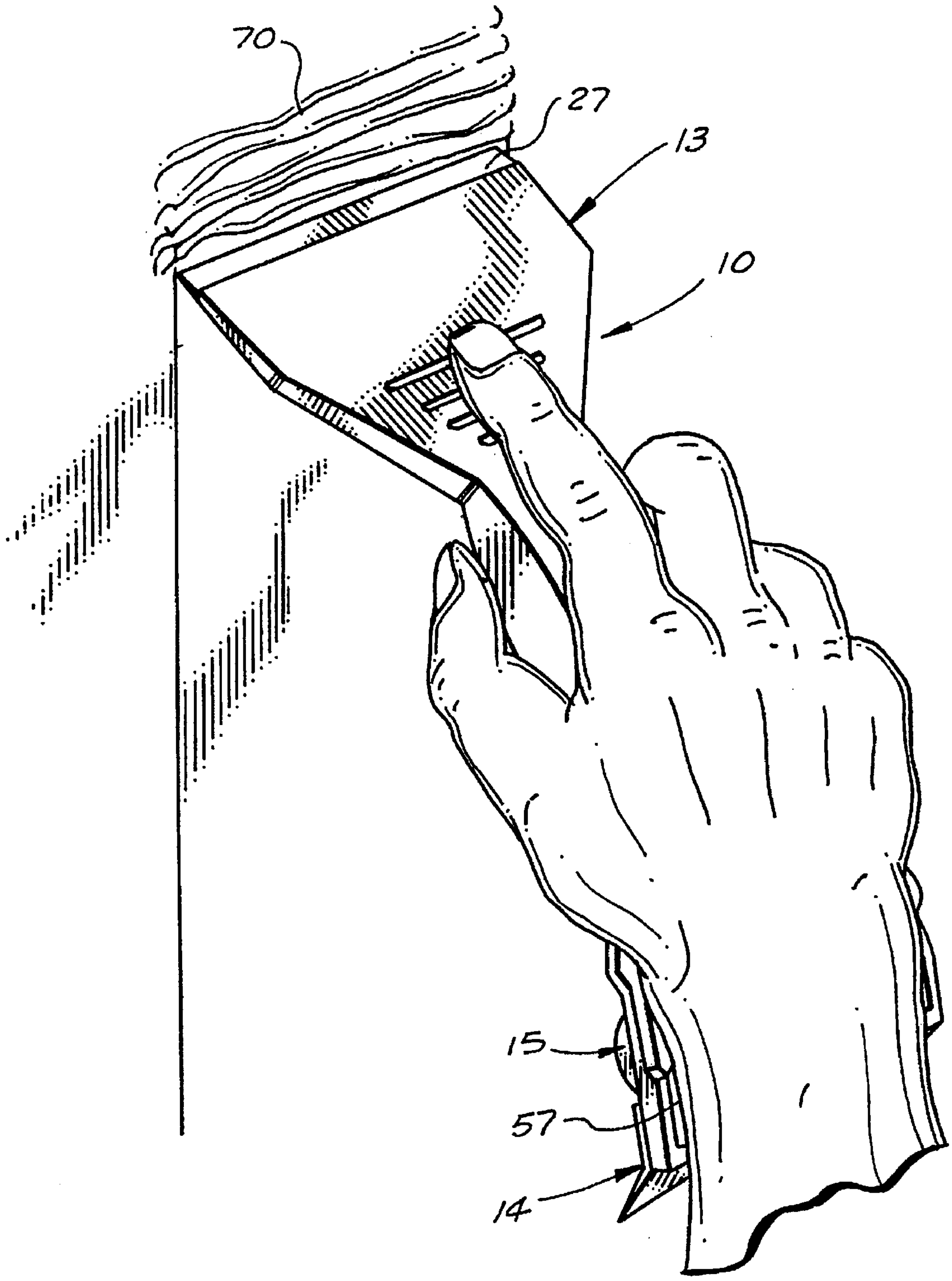
FIG. 12 is a perspective view of the apparatus for removing material from a surface as it would appear being employed as a scraping device.

After scarification, the wall covering is moistened to loosen the adhesive. This step will be discussed in detail below. After loosening the adhesive, push scraper 13 and pull scraper 14 are used to remove the loosened wall covering 70. With reference to FIG. 12 use of push scraper 13 is illustrated. As can be seen, cover 57 over scarifying assembly 15 protects the users wrist from injury during use of push scraper 13. It will be understood that the same procedure could be used with apparatus 62.

Figure 13:
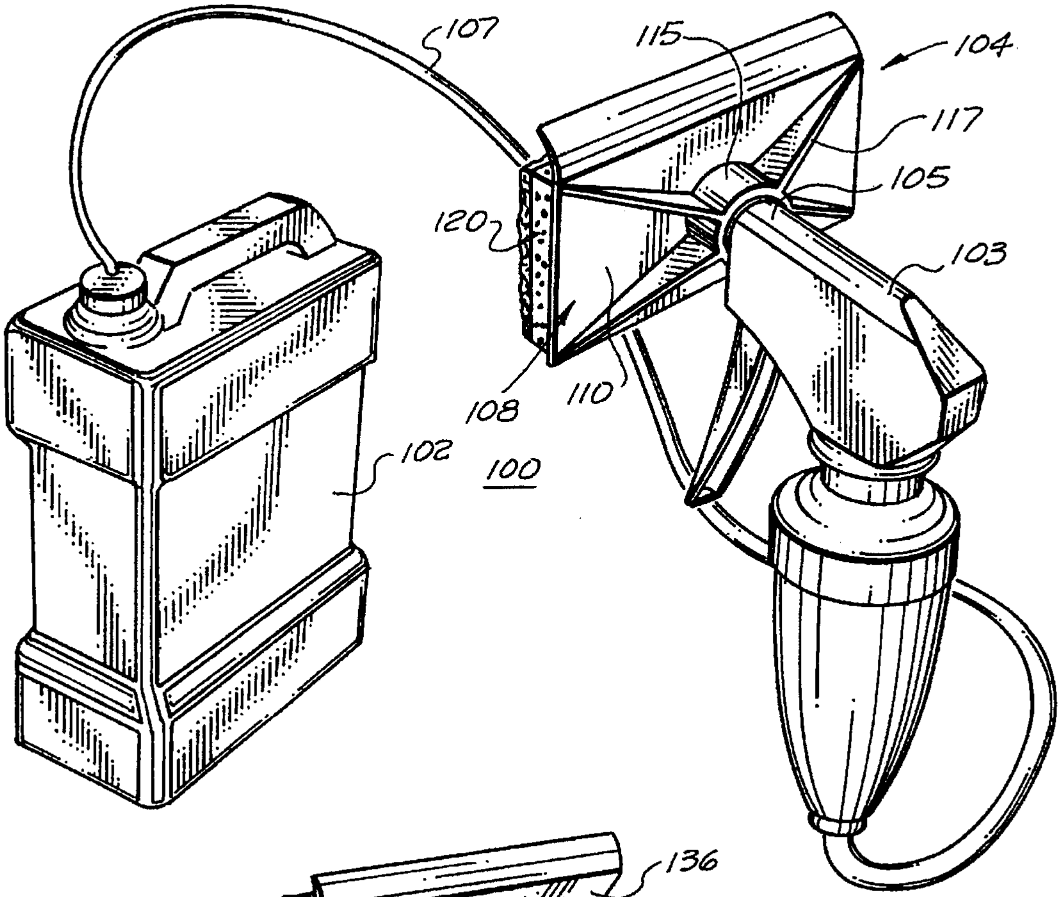
FIG. 13 is a perspective view of a surface cleaning apparatus constructed in accordance with the teachings of the instant invention.

Referring now to FIG. 13, a liquid dispensing and cleaning apparatus generally designated 100 is illustrated. Apparatus 100 includes a liquid reservoir 102, a dispensing device 103 coupled in liquid communication with reservoir 102 for dispensing liquid therefrom and a cleaning device 104 attached to dispensing device 103. Dispensing device 103 is a pump action device having a spray nozzle 105. Reservoir 102 is of a large volume and is coupled to dispensing device 103 by a tube 107. Cleaning device 104 is coupled to dispensing device 103 by a support member 108 positioned so as to avoid hindering a liquid sprayed from nozzle 105.

Figure 15:
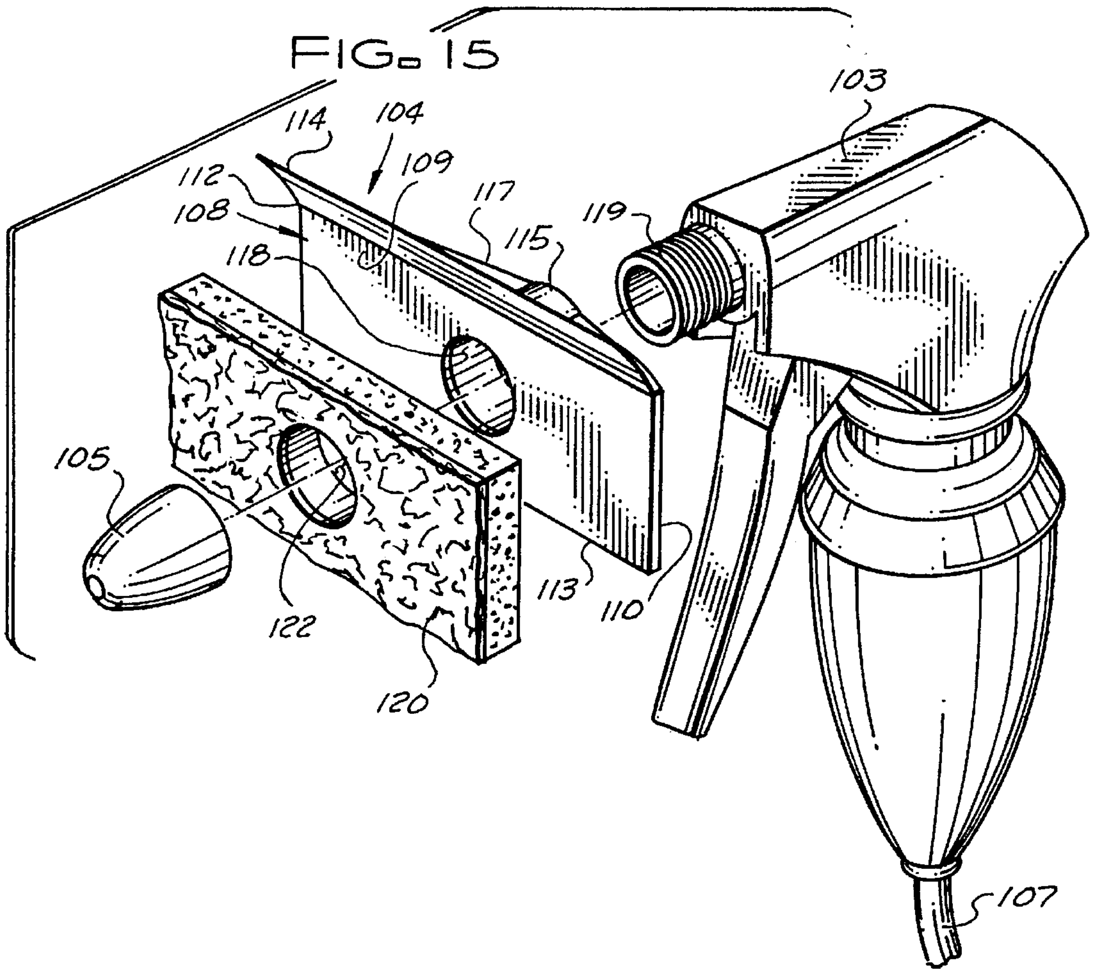
FIG. 15 is an exploded perspective view of a cleaning assembly.

With additional reference to FIG. 15, support member 108 includes a front surface 109, a back surface 110, an upper edge 112 and a lower edge 113. A scraper 114 is formed on upper edge 112 for use in removing wallpaper backing and adhesive from a wall surface. A collar 115 and structural ribs 117 are formed on back surface 110 for attachment to dispensing device 103. An aperture 118, aligned with collar 115, is formed through support member 108 for egress of sprayed liquid without hindrance. In this embodiment, nozzle 105 is received within collar 115. Support member 108 may be integrally molded with dispensing device 103, permanently bonded, or removably affixed thereto. Referring specifically to FIG. 15, it can be seen, that in this embodiment, dispensing device 103 includes a nozzle 105 which is removably attached to a threaded portion 119. Nozzle 105 is removed and threaded portion 119 of dispensing device 103 is received within collar 105 and extends through aperture 118. Nozzle 105 is threaded onto threaded portion 119 holding support member 108 securely in place.

A cleaning member 120 is coupled to front surface 109 of support member 108 so as to extend forwardly of dispensing device 103. An aperture 122 is formed through cleaning member 120, corresponding to aperture 118, to permit egress of dispensed liquid without hindrance. Cleaning member 120 is illustrated as a sponge in this embodiment for use in applying a liquid for loosening wallpaper adhesive, but it will be understood that a brush or other cleaning element may be employed instead. Large volumes of liquid are generally used when removing a wall covering, thus the large reservoir.

Figure 14:
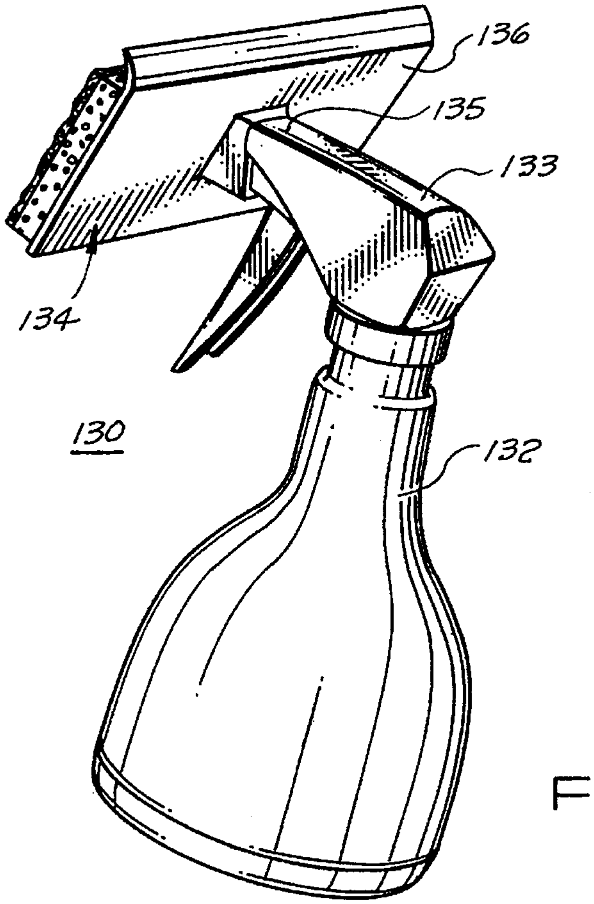
FIG. 14 is a perspective view of another embodiment of a surface cleaning apparatus constructed in accordance with the teachings of the instant invention.

Another embodiment of a liquid dispensing and cleaning apparatus generally designated 130 is illustrated in FIG. 14. This embodiment is intended to illustrate a smaller apparatus, including a reservoir 132 to which a dispensing device 133 is directly coupled. Dispensing device 133 is a pump action device having a spray nozzle 135. A cleaning device 134 is coupled to dispensing device 133 by a support member 136 positioned so as to avoid hindering a liquid sprayed from nozzle 135. Support member 136, in this embodiment, is integrally molded with dispensing device 133, but is otherwise substantially identical to cleaning device 104. Furthermore, it will be understood that support member 136 may be formed without a scraper as is illustrated.

In the ensuing description, various embodiments of cleaning devices and their attachment to the dispensing device are described. It will be understood that each of the cleaning devices may be attached to substantially any type of spray dispenser, including those illustrated in FIGS. 13 and 14. For purposes of this description and simplicity, only one type of dispensing device will be shown.

Figure 16:
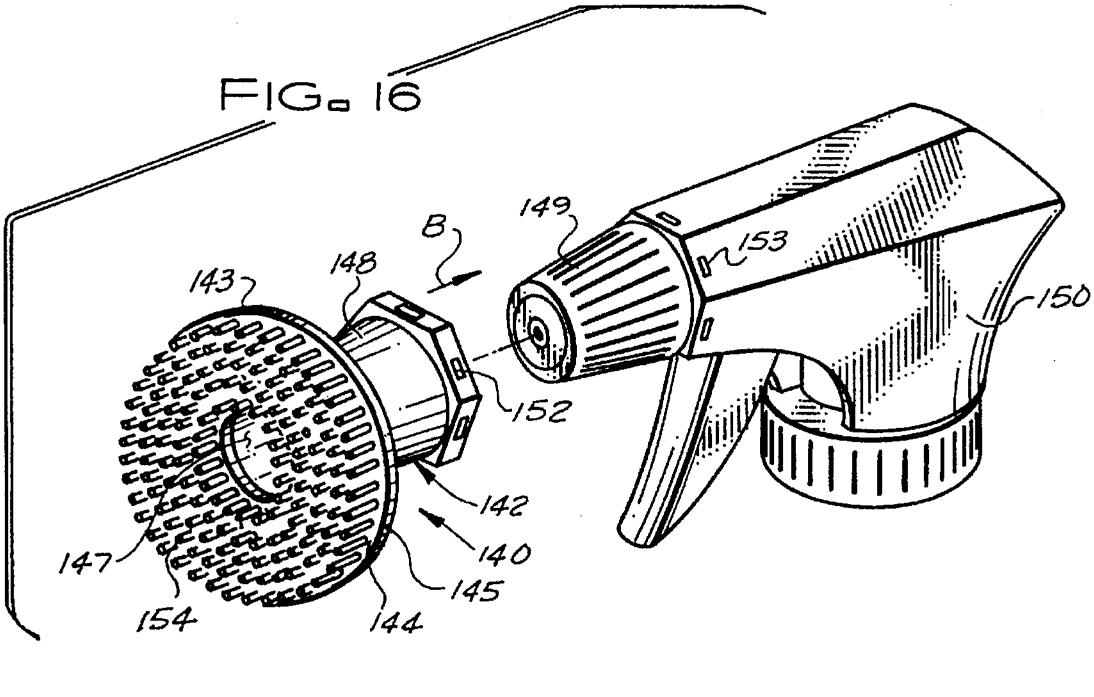
FIG. 16 is a perspective view of an embodiment of a cleaning assembly.

Turning to FIG. 16, a cleaning device generally designated 140 is shown. Cleaning device 140 includes a support member 142 consisting of a disk shaped member 143 having a front surface 144, a back surface 145, a central aperture 147, and a collar 148 coupled to back surface 145 aligned with aperture 147. Collar 148 is configured to engage a nozzle 149 of a dispensing device 150. Slots 152 formed in collar 148 receive tabs 153 extending from dispensing device 150, allowing for removal and attachment of cleaning device 140 as desired, along arrowed lines B. A cleaning member 154 is coupled to front surface 144, and in this embodiment consists of a brush.

Figure 17:
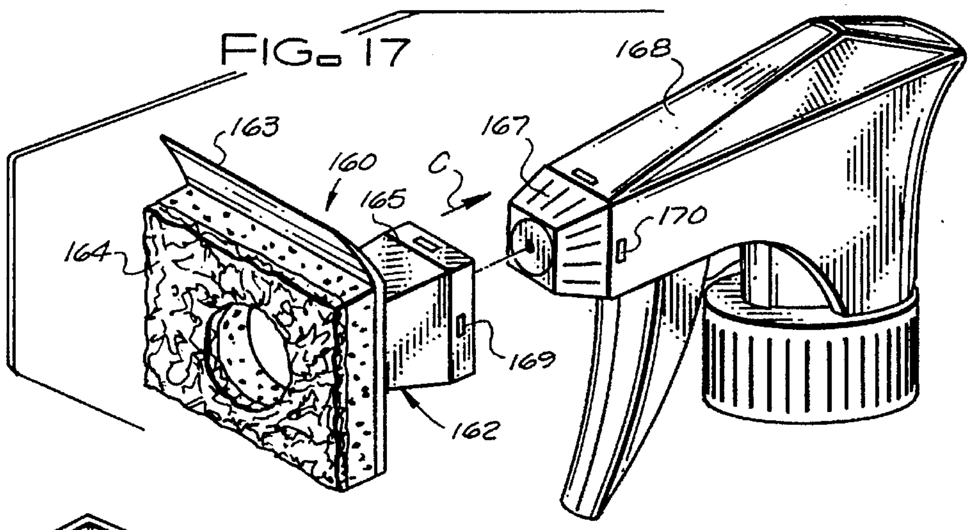
FIG. 17 is a perspective view of an embodiment of a cleaning assembly.

Turning to FIG. 17, a cleaning device 160 generally similar to cleaning device 130 is illustrated. Cleaning device 160 includes the same elements such as a support member 162, scraper 163 and cleaning member 164, but differ in that a collar 165 is configured to engage a nozzle 167 of a dispensing device 168 similar to collar 148 of FIG. 16. Slots 169 formed in collar 165 receive tabs 170 extending from dispensing device 168, allowing for removal and attachment of cleaning device 160 as desired, along arrowed line C. It will be understood that various attachment members for removably attaching a cleaning device to a dispensing device may be employed. In this embodiment, the substantially square shape of collar 165 prevents rotation of nozzle 167 when fitted into position. In most dispensing devices, the nozzle is rotated to obtain different spray strengths. In this embodiment, nozzle 167 is rotated as desired, and cleaning device 160 is attached, preventing further rotation.

Figure 18:
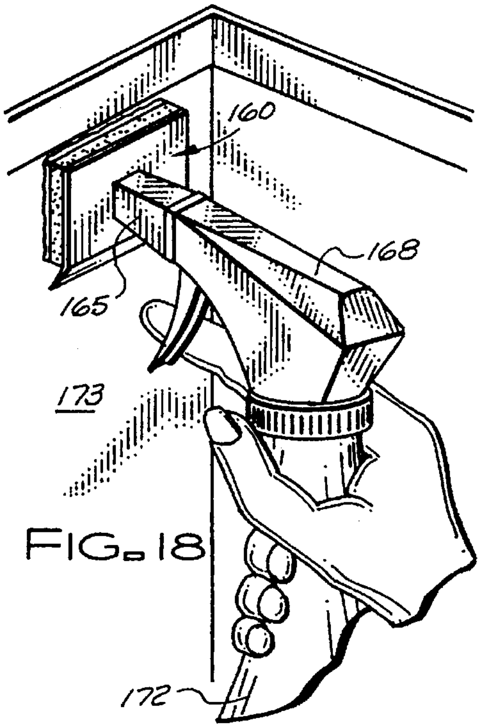
FIG. 18 is a perspective view of the cleaning apparatus of FIG. 17 as it would appear being used to clean a vertical surface.

FIG. 18 illustrates cleaning device 160 and dispensing device 168 coupled to a reservoir 172 of a type shown in FIG. 14, being used to clean a wall surface 173. An individual pumps the dispensing device to deliver a spray of liquid to the wall surface. Cleaning device 160 may be employed to apply liquid to a scarified wall covering prior to removal, or as illustrated here, used to clean a surface. Cleaning device 160 may be rotated when attached to dispensing device 168, to move scraper 163 to a lower position, permitting cleaning member 164 to reach upward into corners or edges.

Figure 20:
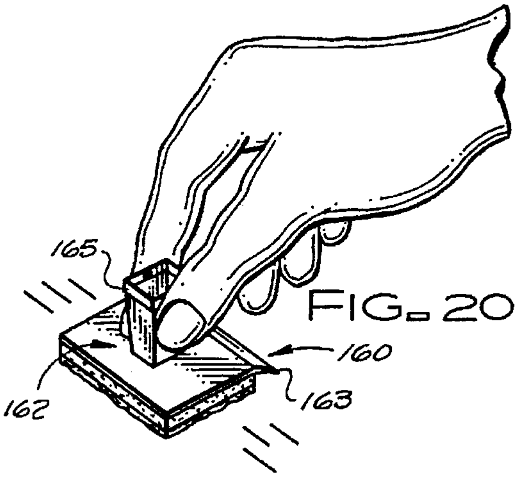
FIG. 20 is a perspective view of the cleaning assembly of FIG. 17 as it would appear being used separate from the cleaning apparatus.
Figure 19:
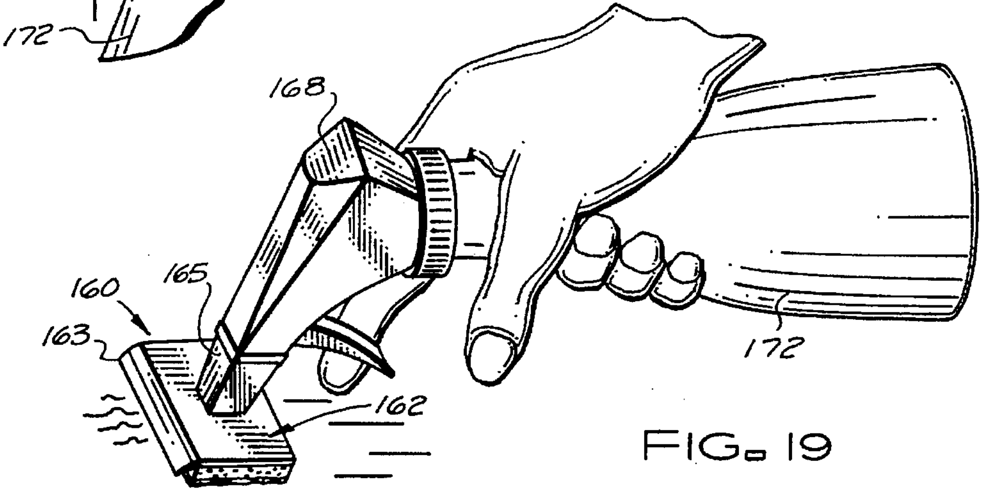
FIG. 19 is a perspective view of the cleaning apparatus of FIG. 17 as it would appear being used to clean a horizontal surface.

Turning to FIG. 19, scraper 163 is used to remove hard to remove materials from a surface, such as gum, etc. or in the case of wall covering removal, areas a paper backing or adhesive, which generally must be moistened then scraped off. Generally scraper 163 is most effective when positioned at the top of the apparatus. When employing a removable cleaning device such as cleaning device 160, it may be separated from the dispensing device and used separately as illustrated in FIG. 20.

Figure 21:
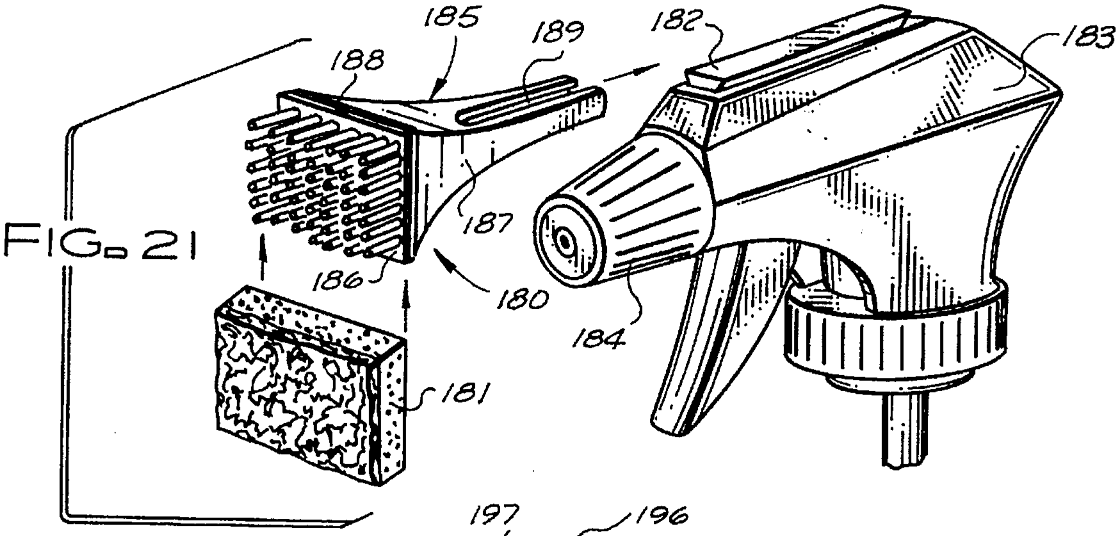
FIG. 21 is a perspective view of an embodiment of a cleaning assembly.

Another embodiment of a removable cleaning device 180 is illustrated in FIG. 21. Cleaning device 180 includes a support member 182 coupled to a dispensing device 183 above a spray nozzle 184, and a cleaning member 185 including a cleaning structure 186 and an attachment member 187 removably coupling cleaning member 185 to support member 182. Support member 182 is a ridge formed integrally with dispensing device 183. Attachment member 187 includes a front surface 188, and a slot 189 configured to receive support member 182, removably coupling cleaning member 185 to dispensing device 183. Cleaning structure 186 is illustrated as a brush affixed to front surface 188, but may be any cleaning material such as a sponge 181.

Figure 22:
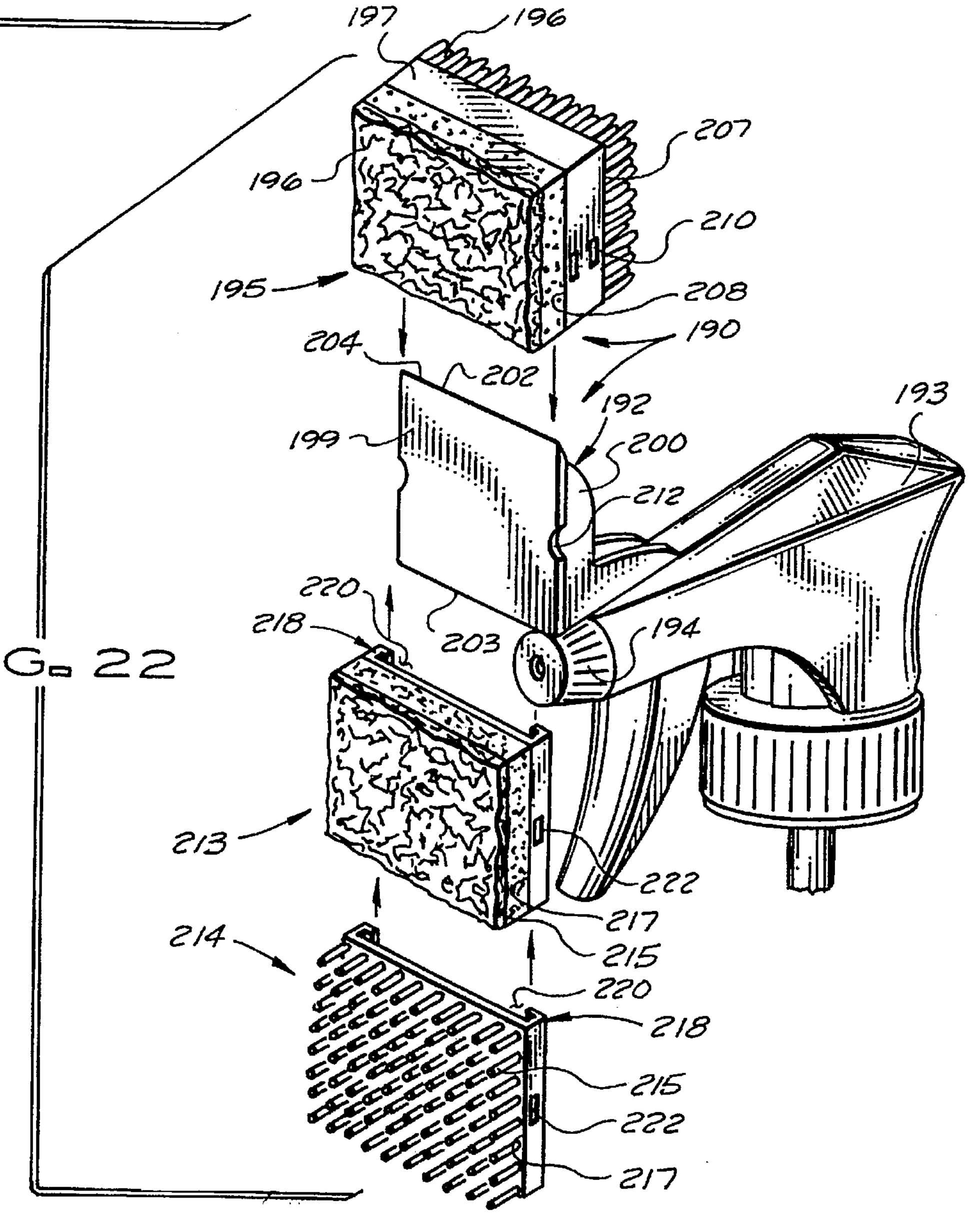
FIG. 22 is a perspective view of an embodiment of a cleaning assembly.

A further embodiment of a cleaning device 190 can be seen with reference to FIG. 22. Cleaning device 190 includes a support member 192 coupled to a dispensing device 193 above a spray nozzle 194, a cleaning member 195 having a pair of cleaning structures 196 and a reversible attachment member 197 coupling cleaning member 195 to support member 192. Support member 192 includes a front surface 199 extending outward past nozzle 194, a back surface 200, an upper edge 202 and a lower edge 203. A scraper 204 is formed on upper edge 202 for use in removing wallpaper backing and adhesive from a wall surface when attachment member 197 is removed.

With additional reference to FIG. 23, attachment member 197 includes a pair of opposing surfaces 207 and 208 with a slot 209 for receiving support member 192, formed therebetween. Attachment member 197 is secured to support member 192 by tabs 210 formed on attachment member 197 and extending into slot 209. When positioned on support member 192, tabs 210 engage indents 212 formed in the edges of support member 192 adjacent front surface 199. Cleaning structures 196 are affixed to opposing surfaces 207 and 208, and can be positioned for use by removing and reversing attachment member 197.

Still referring to FIG. 22, additional cleaning members 213 and 214 may be individual attached to support member 192. Cleaning members 213 and 214 each include a cleaning structure 215 affixed to a front surface 217 of an attachment member 218. A slot 220 is formed opposite front surface 217 and is configured to receive support member 192. Attachment members 218 and 219 are secured to support member 192 by tabs 222 formed on attachment members 218 and extending into slots 220. When positioned on support member 192, tabs 222 engage indents 212 formed in the edges of support member 192 adjacent front surface 199.

Turning to FIG. 24, yet another embodiment of a cleaning device 230 is illustrated. Cleaning device 230 includes a support member 232 integrally formed with a dispensing device 233 above a spray nozzle 234, and a cleaning member 235. Support member 232 includes a front surface 237 extending past nozzle 234 and a top edge 238. In this embodiment, a brush 239 is formed along top edge 238 instead of a scraper. Cleaning member 235 is a sponge affixed to front surface 237.

Yet a further embodiment of a cleaning device 240 is illustrated in FIGS. 25–27. Cleaning device 240 is substantially similar to cleaning device 230, including a support structure 242 having an upper edge 243 and a cleaning member 244. However, instead of a brush, a scraper 245 is formed along upper edge 243. In addition, an additional cleaning members 247 may be removably coupled to scraper 245 employing a clip on attachment member 248.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An apparatus for scarifying a surface material bonded to a substrate, aid apparatus comprising:

a handle;

an axle carried by said handle;

a disc rotatably carried by said axle;

drag means for producing a drag on the rotation of said disc; and said handle including a first end having a first side and a second side, said disc being carried by said first side and a scraper blade carried by said second side for scraping a surface material off of a substrate, a second end and a scraper blade carried by said second end, and a cover for covering said disc to prevent injuring a user during use of said scraper blades.

2. An apparatus as claimed in claim 1 wherein said disc includes a plurality of teeth radiating radially outward from a peripheral edge of said disc, said plurality of teeth each having a hooked shape.

3. An apparatus as claimed in claim 2 wherein said plurality of teeth, each having a hooked shape, further include a flattened edge at a radially terminal end adjacent a tip.

4. An apparatus as claimed in claim 1 wherein said drag means includes a tension washer, configured to bind between said disc and said handle.

5. An apparatus as claimed in claim 1 wherein said apparatus further includes a plurality of substantially parallel discs, each rotatably carried by an axle, said axles being carried by said handle along substantially parallel axis.

6. An apparatus for removing material from a surface comprising:

a handle having a first end and a second end;

a scarifying assembly coupled to said first end;

a first scraper blade coupled to said second end; and a removable cover removably couplable to said handle enclosing said scarifying assembly.

7. An apparatus as claimed in claim 6 wherein said scarifying assembly includes:

an axle carried by said handle;

a disc rotatably carried by said axle; and drag means for producing a drag on the rotation of said disc.

8. An apparatus as claimed in claim 7 wherein said disc includes a plurality of teeth radiating radially outward from a peripheral edge of said disc, said plurality of teeth each having a hooked shape.

9. An apparatus as claimed in claim 8 wherein said plurality of teeth, each having a hooked shape, further include a flattened edge at a radially terminal end adjacent a tip.

10. An apparatus as claimed in claim 7 wherein said drag means includes a tension washer, configured to bind between said disc and said handle.

11. An apparatus as claimed in claim 7 wherein said apparatus further includes a plurality of substantially parallel discs, each rotatably carried by an axle, said axles being carried by said handle along substantially parallel axis.

12. An apparatus as claimed in claim 6 wherein said scarifying assembly includes a toothed blade extending from said handle in an upright manner.

13. An apparatus as claimed in claim 10 wherein said first end of said handle includes a first side and a second side, said disc being carried by said first side and a second scraper blade carried by said second side for scraping said surface material off of said surface.

* * * * *